(No Model.)

P. J. G. FIRCHAU.
MACHINE FOR WORKING CANDY.

No. 511,011. Patented Dec. 19, 1893.

Witnesses:
C. H. Raeder
K. F. Matthews.

Inventor
Paul J. G. Firchau
By James J. Sheehy
Attorney

UNITED STATES PATENT OFFICE.

PAUL JOHN GOTTLIEB FIRCHAU, OF WEST PLAINS, MISSOURI.

MACHINE FOR WORKING CANDY.

SPECIFICATION forming part of Letters Patent No. 511,011, dated December 19, 1893.

Application filed March 9, 1893. Serial No. 465,362. (No model.)

*To all whom it may concern:*

Be it known that I, PAUL JOHN GOTTLIEB FIRCHAU, a citizen of the United States, residing at West Plains, in the county of Howell and State of Missouri, have invented certain new and useful Improvements in Machines for Working Candy; and I do declare the following to be a full, clear, and exact description of the invention, such as will enable others skilled in the art to which it appertains to make and use the same.

My invention relates to improvements in machines for working or pulling candy or the like, and it has for its general object to provide such a machine of a cheap, simple and durable construction and one which is adapted to thoroughly work a large mass of candy in a short space of time.

Another object of the invention is to provide a candy working machine embodying such a construction that its capacity may be readily and conveniently increased when desired.

Other objects and advantages of the invention will be fully understood from the following description and claims when taken in connection with the annexed drawings, in which—

Figure 1:
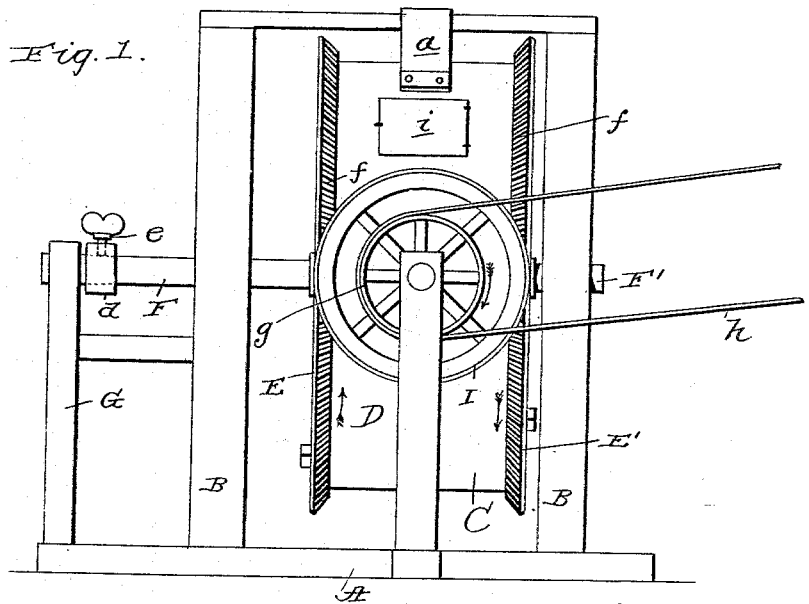
Figure 2:
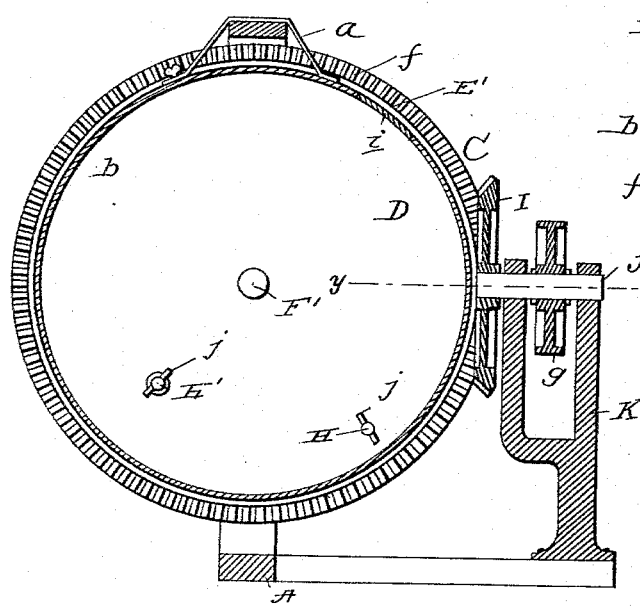
Figure 3:
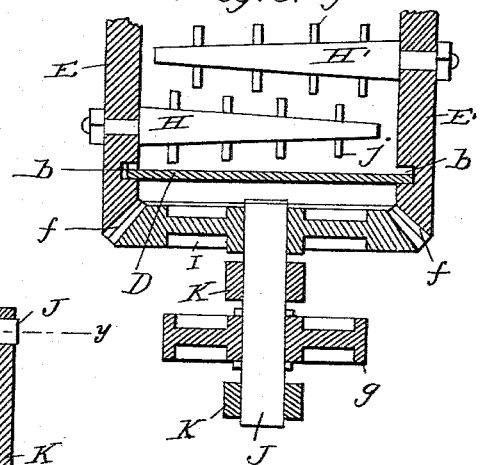

Figure 1, is a front elevation of the machine. Fig. 2, is a vertical section taken at right angles to Fig. 1, and Fig. 3, is a horizontal section taken in the plane indicated by the line $y, y,$ of Fig. 2.

Referring by letter to said drawings: A, indicates the base of my improved machine which may be of any approved form and construction, and B, indicates the standards or uprights which rise from said base and are designed to support the candy receiving drum C, as will be presently described. The drum C, is preferably formed from metal and it comprises a hollow cylindrical body D, which is held against rotation preferably by the strap $a$, and the rotary disk like heads E, E', which are provided in their inner sides with circular grooves $b$, to loosely receive the ends of the body D, as better shown in Fig. 3. Thus it will be seen that the heads and body of the drum may be readily disconnected by simply moving the heads laterally in opposite directions and if desired a drum of greater length and proportionately greater capacity may be readily placed and secured between the heads.

F, F', indicate the trunnions of the heads E, E', which extend laterally from said heads and are journaled in the standards B, as shown. One of these trunnions F, is of sufficient length to permit play of its head between the body D, and the adjacent standard; and this trunnion F, extends entirely through the standard B, and an auxiliary standard G, and it is provided with a loose collar $d$, which is designed to be adjustably fixed by a set screw $e$, so as to engage the standard G, and hold the disk E, in the position desired. By this construction it will be readily perceived that the disks E, E', may be readily separated, and the body D, may be conveniently removed, cleansed and replaced without the employment of skilled labor, which is a desideratum. Furthermore it will be seen that the distance between the disks may be varied so as to enable them to receive bodies of different lengths between them.

Suitably connected to the disks E, E', at points off the center and extending inwardly therefrom, are the fingers H, H', which are designed to engage and pull or work the candy as will be presently described. These fingers H, H', are carried in opposite directions by their heads, and they are consequently arranged at different distances from the center of the drum so as to pass each other when in operation. The heads E, E', may be rotated in opposite directions by any suitable gearing, but I prefer in practice to provide them with bevel gear teeth as $f$, and drive them through the medium of the bevel gear wheel or pinion I, which engages both heads as illustrated. This pinion or gear wheel I, is mounted on a shaft J, disposed at right angles to the drum, and this shaft is journaled in a standard K, and is provided with a pulley $g$, around which takes a belt $h$, which may be driven by any suitable motor.

The gearing above described is desirable for the reason that it is very compact and takes but a minimum amount of floor space which is always an advantage in a candy factory and similar places.

In the practical operation of my improved machine, the candy is introduced into the drum through the door $i$, formed in the body D, and is hung upon one of the fingers of the heads, preferably the inner finger H'. The door is then closed and the machine is set in motion when the heads E, E', will be rotated in opposite directions as described and the candy depending from the inner finger will be engaged by the finger H, and will be carried in the opposite direction and stretched and worked. This takes place at each rotation of the heads, the candy being alternately massed and stretched, and it will thus be seen that it is quickly and thoroughly worked. In some cases the fingers H, H', are provided at intervals in their length with knobs as $j$, so as to better adapt them to hold the candy and prevent the same from slipping off.

I have specifically described the construction and relative arrangement of the several parts of my improved machine so as to impart a full and clear understanding of the same, but I do not desire to be confined to such construction and arrangement as such changes or modifications may be made in practice as fairly fall within the scope of my invention.

Having described my invention, what I claim is—

1. In a machine for working candy and other substance, the combination of a hollow cylindrical body, suitable means for fixing said body against rotation, heads having circular grooves in their inner sides to receive the ends of the body and carrying lateral fingers arranged so as to travel in different orbits, and suitable means for rotating said heads in opposite directions, substantially as and for the purpose set forth.

2. In a machine for working candy and other substance, the combination of a hollow body, heads closing the ends of said body, trunnions connected to the heads and journaled in suitable bearings, a collar loosely mounted on one of the trunnions and adapted to engage the bearing thereof, and suitable means for adjustably fixing said collar, substantially as and for the purpose set forth.

In testimony whereof I affix my signature in presence of two witnesses.

PAUL JOHN GOTTLIEB FIRCHAU.

Witnesses:
M. C. BENSON,
ELMER STONE.